(12) United States Patent
Nishiie

(10) Patent No.: US 8,632,004 B2
(45) Date of Patent: Jan. 21, 2014

(54) CARD PROCESSING APPARATUS

(75) Inventor: Toru Nishiie, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 318 days.

(21) Appl. No.: 12/845,946

(22) Filed: Jul. 29, 2010

(65) Prior Publication Data

US 2011/0024497 A1 Feb. 3, 2011

(30) Foreign Application Priority Data

Aug. 3, 2009 (JP) .................................. 2009-180892

(51) Int. Cl.
*G06F 15/00* (2006.01)
*G06K 5/00* (2006.01)
*G06K 7/08* (2006.01)
*G06K 15/00* (2006.01)
*G06Q 20/00* (2012.01)

(52) U.S. Cl.
USPC ............ 235/380; 235/375; 235/383; 235/435; 235/449; 705/16; 705/17

(58) Field of Classification Search
USPC ......... 235/375, 380, 381, 383, 435, 482, 449; 705/16–17
See application file for complete search history.

(56) References Cited

U.S. PATENT DOCUMENTS

| 6,147,673 | A  | * | 11/2000 | Zarek ............................ 345/156 |
| 6,679,425 | B1 | * | 1/2004 | Sheppard et al. ............. 235/382 |
| 7,229,013 | B2 |   | 6/2007 | Ben-Aissa |
| 2004/0004121 | A1 | * | 1/2004 | Nakamura et al. ............ 235/441 |
| 2005/0109836 | A1 | * | 5/2005 | Ben-Aissa .................... 235/380 |
| 2007/0291932 | A1 | * | 12/2007 | Kao ............................... 379/419 |

FOREIGN PATENT DOCUMENTS

| CN | 2447874 | 9/2001 |
| CN | 101290701 | 10/2008 |
| JP | 08-165826 | 6/1996 |
| JP | 2001-155257 | 6/2001 |
| JP | 2001-351045 | 12/2001 |
| JP | 2004-094841 | 3/2004 |
| JP | 2008-200207 | 9/2008 |

OTHER PUBLICATIONS

Japanese Office Action for Application No. 2009-180892 mailed on May 31, 2011.
Notification of the First Office Action for Application No. 201010242417.0 Dated Nov. 22, 2012, 16 pgs.

* cited by examiner

*Primary Examiner* — Michael G Lee
*Assistant Examiner* — Laura Gudorf
(74) *Attorney, Agent, or Firm* — Turocy & Watson, LLP

(57) ABSTRACT

According to one embodiment, includes an operation surface section, a card reader provided on one side of the operation surface section and configured to read card information, and an operation button provided near the card reader on the operation surface section and recessing a predetermined dimension from the operation surface section.

9 Claims, 3 Drawing Sheets

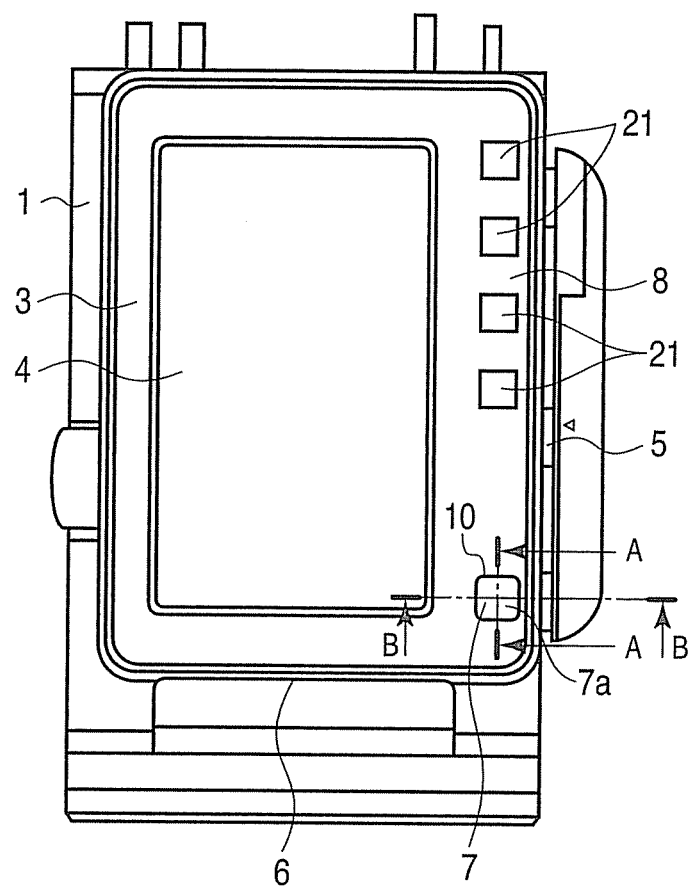
F I G. 1
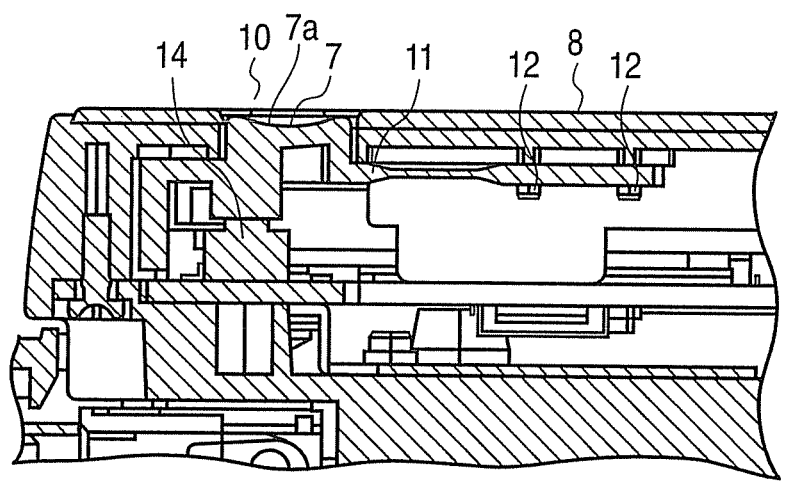
F I G. 2

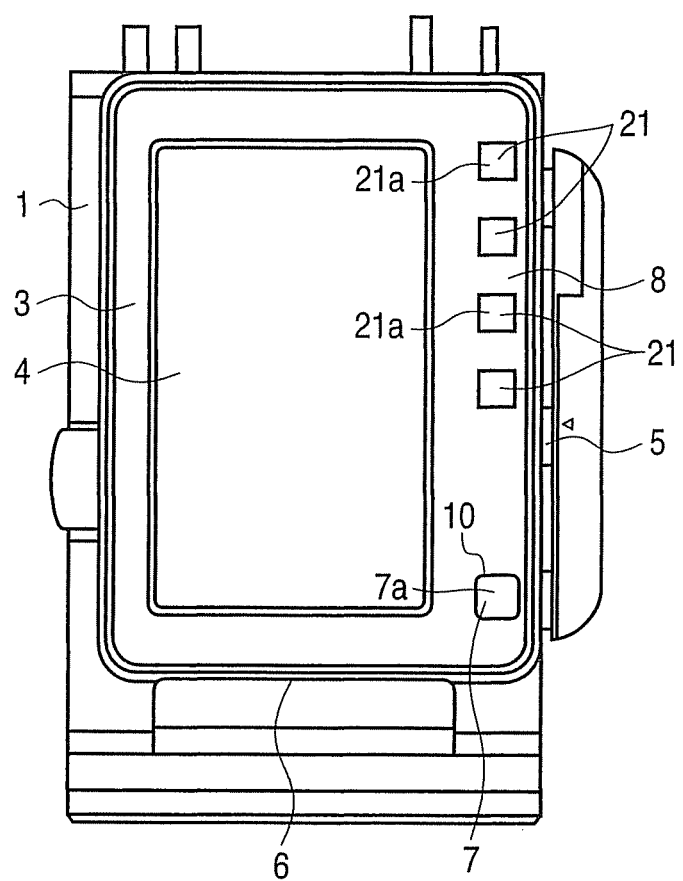
F I G. 5

CARD PROCESSING APPARATUS

CROSS-REFERENCE TO RELATED APPLICATIONS

This application is based upon and claims the benefit of priority from Japanese Patent Application No. 2009-180892, filed Aug. 3, 2009; the entire contents of which are incorporated herein by reference.

FIELD

Embodiments described herein relate generally to, for example, a card processing apparatus applied as a card settlement terminal.

BACKGROUND

As a commodity sales processing apparatus, for example, a terminal attached to a POS terminal, a register, or the like, there is a terminal for card settlement. This terminal includes a display section, an operation surface section, and a card reader and displays information concerning sales of commodities on the display section.

A store clerk in a store inputs a sales price using a ten key of the operation surface section and inserts an IC card, a debit card, or a credit card presented by a customer into a card reader of the terminal, whereby settlement is completed.

Various operation buttons are disposed on the operation surface section. Information is input by pressing of the operation buttons. One of the operation buttons is used as a reset button. When the reset button is pressed, the input information and read information of the card reader are reset.

The various operation buttons are usually provided near the card reader because of a structural limitation and the upper ends of the operation buttons are projected upward from the operation surface section (see, for example, JP-A-2004-94841).

Therefore, in the past, when the store clerk slides the card along the card reader, in some case, a hand holding the card touches some of the operation buttons by mistake and depresses the operation buttons.

In this case, it is likely that the store clerk performs undesired operation. In addition, when a depressed operation button is the reset button, it is likely that information read by the store clerk is reset. When the store clerk depresses the reset button, the store clerk has to input the information again. Therefore, it is likely that the store clerk gives an unpleasant feeling to the customer and loses a chance of commodity sales.

Therefore, it is desired that, when the store clerk slides the card along the card reader, the hand holding the card does not touch the operation buttons.

BRIEF DESCRIPTION OF THE DRAWINGS

FIG. 1 is a plan view of a card processing apparatus according to an embodiment;
FIG. 2 is a sectional view taken along line A-A in FIG. 1;
FIG. 5 is a plan view of a card processing apparatus according to another embodiment.

DETAILED DESCRIPTION

Figure 3:
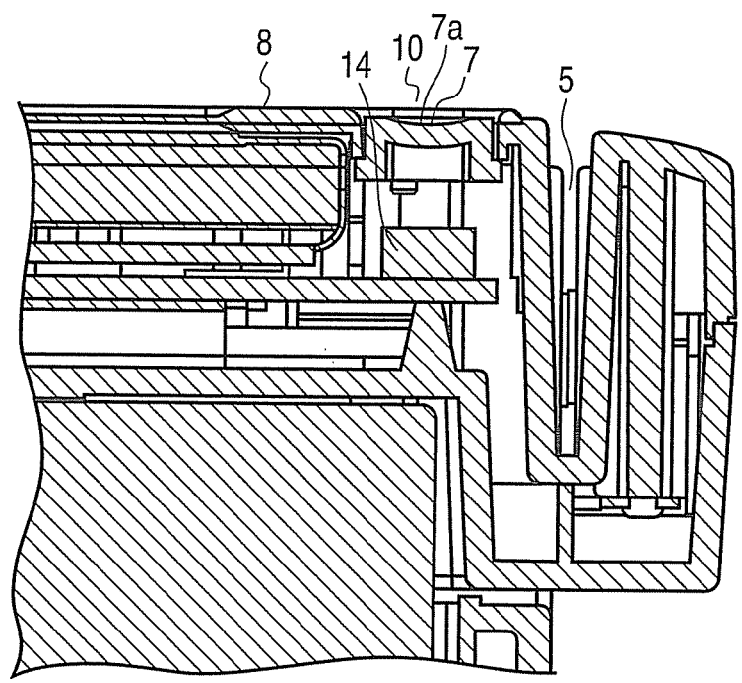
FIG. 3 is a sectional view taken along line B-B in FIG. 1.

In general, according to one embodiment, a card processing apparatus includes: an operation surface section; a card reader provided on one side of the operation surface section and configured to read card information; and an operation button provided near the card reader on the operation surface section and recessing a predetermined dimension from the operation surface section.

Embodiments are explained below with reference to the accompanying drawings.

FIG. 1 is a plan view of a card settlement terminal as a card processing apparatus according to an embodiment.

The card settlement terminal includes an apparatus main body 1. The apparatus main body 1 is set on a register counter or the like of a store together with a POS terminal (not shown) and a register (not shown). A power switch (not shown) is provided on a side section of the apparatus main body 1. An upper unit 3 and a paper discharge port 6 of a printer are provided on the upper surface section of the apparatus main body 1.

One end side of the upper unit 3 is pivotally supported to freely open and close on the apparatus main body 1. The upper surface section of the upper unit 3 is an operation surface section 8. A rectangular touch panel-type display section 4 and a reset button 7 as an operation button are disposed on the operation surface section 8. The touch panel-type display section 4 and the reset button 7 are arranged on the same plane. A card reader 5 is provided on one side of the operation surface section 8 of the upper unit 3.

The reset button 7 is provided near the card reader 5 on the other end side of the upper unit 3 because of a structural limitation.

A PC board is provided on a lower part side of a not-shown LCD (liquid crystal display) of the touch panel-type display section 4. The LCD and the PC board are connected by a cable. The card reader 5 and the PC board are also connected by a cable. Therefore, a space for housing the cables is necessary between the touch panel-type display section 4 and the card reader 5. For a reduction in size of a terminal, it is desirable to provide a reset switch 14 explained later making use of the space. Therefore, the reset button 7 for operating the reset switch 14 is provided near the card reader 5.

A card for settlement such as an IC card, a debit card, or a credit card presented by a customer is inserted into the card reader 5 and slid, whereby the card reader 5 reads data recorded in the card.

The discharge port 6 of the printer discharges a credit slip on which settlement information of settlement based on touching on the touch panel-type display section 4 and read information of the card reader 5 is printed.

The reset button 7 is pressed, for example, when the customer requests a change of a card that the customer uses. When the reset button 7 is pressed, input information input on the touch panel-type display section 4 and read information read by the card reader 5 are reset.

When the customer changes his or her mind and changes a card while operating the card to perform settlement, it is necessary to quickly press the reset button 7. Therefore, the reset button 7 is desirably provided apart from the other end of the upper unit 3 by a small distance such that the reset button 7 can be easily pressed by a finger or the like.

When a commodity that the customer is about to purchase is carried to the register counter, a store clerk in the store inserts an IC card, a debit card, or a credit card presented by the customer into the card reader 5 and slides the card to read card information. Subsequently, the store clerk touches a ten key screen displayed on the touch panel-type display section 4 to input a sales amount, a payment method, and the like and, after the input, presses a transmission button to transmit the sales amount, the payment method, and the like.

According to the transmission, settlement for the commodity purchase is performed on the POS terminal side. When the settlement is approved, a credit slip on which content of the settlement is printed is discharged from the paper discharge port 6 of the upper unit 3.

On the other hand, in the operation surface section 8 of the upper unit 3, as also shown in FIGS. 2 and 3, an opening section 10 for exposing the reset button 7 is provided. The reset button 7 is integrally formed in an actuation piece 11 provided in the inside of the upper unit 3. One end side of the actuation piece 11 is fixed to a ceiling surface side of the upper unit 3 by a fixing member 12.

The lower surface side of the reset button 7 is opposed to the reset switch 14. When the reset button 7 is depressed by the store clerk, the actuation piece 11 is elastically deformed downward and the lower surface section of the reset button 7 turns on the reset switch 14.

When the reset switch 14 is turned on, the input information input on the touch panel-type display section 4 and the read information read by the card reader 5 are reset. When the depression of the reset button 7 is released, the actuation piece 11 returns upward with spring force thereof and causes the reset button 7 to return to an initial position.

In this embodiment, the card processing apparatus including the touch panel 4 reduced in size is explained as an example. When operation is performed by using the touch panel 4, since a screen is switched when the buttons of the touch panel 4 are depressed, the reset button 7 needs to be provided on the outside of the screen. In terms of operation, the reset button 7 is desirably present on a plane same as the touch panel 4.

However, if the reset button 7 is provided near the card reader 5 as explained above and the upper end of the reset button 7 is projected from the opening section 10 as in the past, it is likely that the store clerk depresses the reset button 7 by mistake when the store clerk pulls the card along the card reader 5.

Therefore, in this embodiment, a curved surface 7a having a concave shape is formed on the upper surface section of the reset button 7 and the reset button 7 is provided such that the curved surface 7a is located a predetermined dimension below the opening section 10 of the operation surface section 8.

Therefore, when pressing the reset button 7, the store clerk cannot press the reset button 7 unless the store clerk depresses the reset button 7 from right above the reset button 7.

Since the curved surface 7a of the upper surface section of the reset button 7 is located the predetermined dimension below the opening section 10 of the operation surface section 8 in this way, even if the reset button 7 is provided near the card reader 5, a hand holding the card during sliding of the card does not touch the reset button 7.

Therefore, the store clerk does not operate the reset button 7 by mistake and does not reset read information read by the card reader 5.

Figure 4:
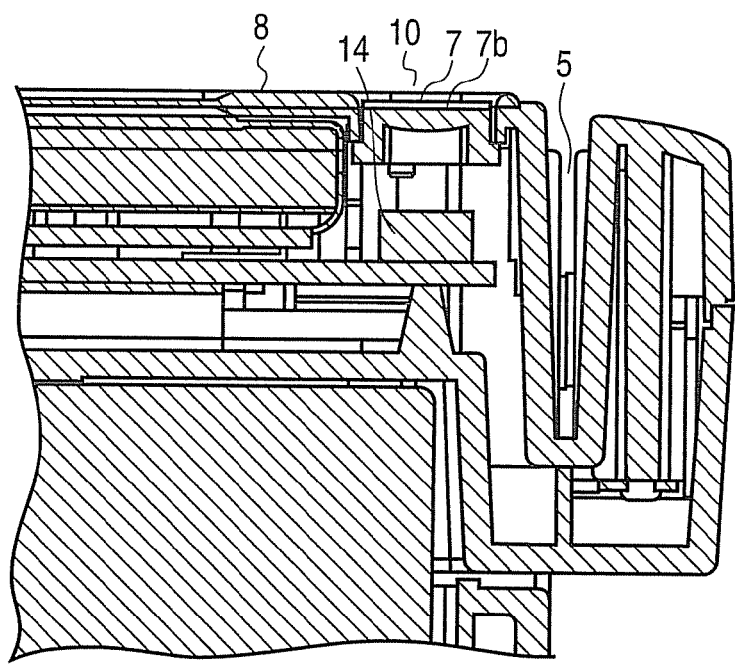
FIG. 4 is a sectional view of another example of a reset button.

In the embodiment, the curved surface 7a having a concave shape is formed on the upper surface section of the reset button 7 and the reset button 7 is provided such that the curved surface 7a is located the predetermined dimension below the opening section 10 of the operation surface section 8. However, the present invention is not limited to this. As shown in FIG. 4, it is also possible to form the upper surface section of the reset button 7 as a horizontal surface 7b and provide the reset button 7 such that the horizontal surface 7b is located the predetermined dimension below the opening section 10 of the operation surface section 8.

In the embodiment, only the reset button 7 is provided as the operation button. However, the present invention is not limited to this. As shown in FIG. 5, it is also possible to dispose plural various operation buttons 21 along the card reader 5, form curved surfaces 21a having a concave shape on the upper surface sections of the operation buttons 21, and locate the curved surfaces 21a the predetermined dimension below the operation surface section 8.

It is also possible to dispose the plural various operation buttons 21 along the card reader 5, form horizontal surfaces on the upper surface sections of the operation buttons 21, and locate the horizontal surfaces the predetermined dimension below the operation surface section 8.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A card processing apparatus comprising:
an apparatus main body;
an upper unit, one end side of the upper unit being pivotally supported to facilitate opening and closing of the upper unit on the apparatus main body;
an operation surface section which is an upper surface section of the upper unit;
a card reader provided on one side of the operation surface section and configured to read card information by sliding a card therethrough;
a touch panel provided on the operation surface section;
an operation button provided between the touch panel and the card reader and near the card reader on the other end side of the upper unit, and recessing a predetermined dimension from the operation surface section; and
a switch provided below the operation button and between the touch panel and the card reader, and operated by the operation button.

2. The apparatus according to claim 1, wherein an upper surface section of the operation button is exposed to an outside from an opening section formed in the operation surface section.

3. The apparatus according to claim 1, wherein an upper surface section of the operation button is a curved surface curved in a concave shape.

4. The apparatus according to claim 1, wherein an upper surface section of the operation button is formed in a plane shape.

5. The apparatus according to claim 1, wherein the operation button is arranged on a same plane as the touch panel.

6. The apparatus according to claim 1, wherein the operation button actuates the switch for resetting input information input on the touch panel and read information read by the card reader to states before the input and the reading.

7. The apparatus according to claim 1, wherein the apparatus is applied as a settlement terminal.

8. The apparatus according to claim 7, wherein the apparatus prints settlement information based on touching on the touch panel and read information of the card reader.

9. The apparatus according to claim 1, wherein a plurality of the operation buttons are disposed along the card reader.

* * * * *